United States Patent [19]
Clarke et al.

[11] 3,979,803
[45] Sept. 14, 1976

[54] QUICK RELEASE LATCH
[75] Inventors: George E. Clarke, Lexington Park; Joseph G. Hoeg, California, both of Md.
[73] Assignee: The United States of America as represented by the Secretary of the Navy, Washington, D.C.
[22] Filed: Nov. 2, 1973
[21] Appl. No.: 412,078

[52] U.S. Cl. .............................. 24/248 D; 294/83 R
[51] Int. Cl.² ................... A44B 21/00; B64D 17/38
[58] Field of Search ............... 224/42.25; 294/83 R, 294/66 R; 24/248 D, 248 E

[56] References Cited
UNITED STATES PATENTS

| 600,098 | 3/1898 | Summers | 224/42.25 UX |
| 2,024,222 | 12/1935 | Hinchman | 294/83 R |
| 2,245,270 | 6/1941 | Goode | 294/83 R |
| 2,327,751 | 8/1943 | Unthank et al. | 294/83 R |
| 2,350,999 | 6/1944 | Beirise | 294/83 R X |

FOREIGN PATENTS OR APPLICATIONS
665,600   1/1952   United Kingdom ............... 294/83 R Primary Examiner—Donald A. Griffin
Attorney, Agent, or Firm—R. Sciascia; R. Beers; S. Sheinbein

[57] ABSTRACT

A quick release latch has a pair of jaws pivotally mounted for holding a load. An abutting toggle link mechanism having a master and a slave link controls movement of the jaws. The master link is pivotally connected to one of the jaws, and the slave link is pivotally connected at one of its ends to one of the jaws, and at its other end to the master link. The master link has a stop pin thereon which contacts the slave link when the linkage mechanism is moved forward past a center line position, permanently restraining the jaws in their closed position. Cantilever springs help to hold the jaws in their closed position. Pulling the toggle links aft thru the center line allows the force of the load and cantilever springs to rapidly open the jaws.

7 Claims, 4 Drawing Figures

QUICK RELEASE LATCH

BACKGROUND OF THE INVENTION

The present invention relates to latching devices and more specifically to a quick release latch for restraining aircraft prior to launch.

In restraining aircraft prior to launch, the Navy presently uses a multitude of frangible devices such as tension bars and tension rings. Since these frangible elements are consumable items, these systems present a logistics problem. Additionally, they do not provide a manual release capability. The existing systems release at only one prescribed load level. Furthermore, they are not suitable for maintenance run-up purposes.

SUMMARY OF THE INVENTION

The quick release mechanism of the present invention provides a simple combination of toggles and levers to control jaw release with minimal release loads. The geometry of the release latch uses the applied load to aid in opening the jaws to minimize load release time. The jaw geometry also enables the latch to sustain high loads without appreciable wear on the jaws. Cantilever springs act on the jaws to maintain the over center line, lock position when in a no-load or vibration environment. The cantilever springs also provide a positive jaw opening when the jaws are released from a no-load condition.

An object of the present invention is to provide a quick release latch that requires minimal release loads for its actuation.

Another object is to provide a quick release latch that releases on command.

Other objects, advantages, and novel features of the present invention will become apparent from the following detailed description of the invention when considered in conjunction with the accompanying drawings.

DESCRIPTION OF THE PREFERRED EMBODIMENT

Figure 1:
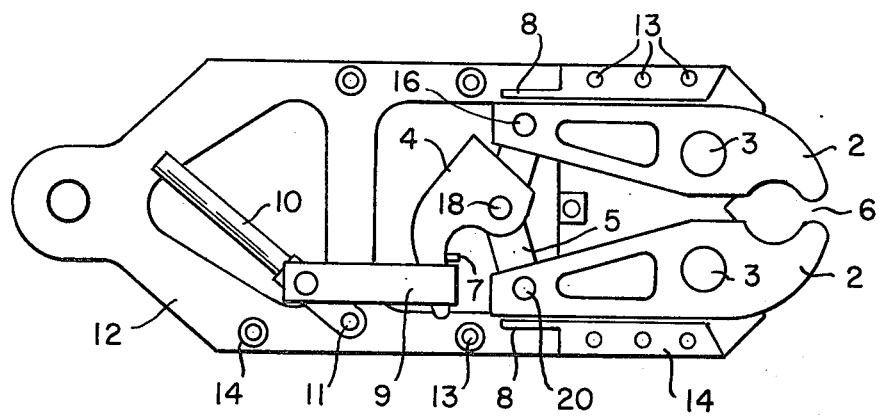
FIG. 1 is a plan view of the release latch mechanism with the top plate removed.

FIG. 1, which illustrates a preferred embodiment of the mechanism, shows a pair of jaws 2 pivotally connected at 3 by pins to a side or bottom plate 12. The forward end of the jaws forms a variable throat 6. The rear ends of the jaws are pivotally connected to a toggle linkage. The toggle linkage consists of a master toggle link 4 pivotally connected at 16 by a pin to the rear end of the of the jaws. A slave toggle link 5 has one of its ends connected to a jaw by a pin 20, and its other end connected to the master toggle link 4 by a pin 18.

Figure 2:
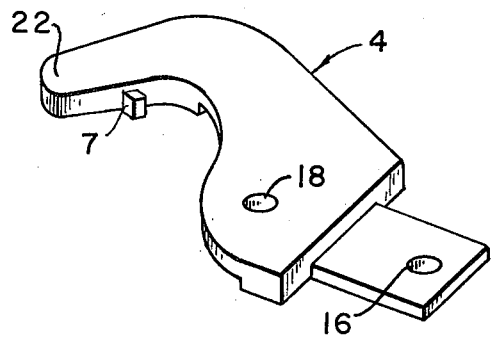
FIG. 2 is a perspective view of the master toggle link.

The master toggle link 4 is better depicted in FIG. 2. As can be seen in FIG. 2, the free end 22 of the master toggle link has a pin 7 connected to it. The pin may be welded to the master toggle link 4, connected in any other suitable manner or integrally formed therewith. The pin 7 functions as a stop mechanism and will be referred to in regard to the operation of the quick release latch.

Figure 3:
FIG. 3 is a perspective view of the draw bar.
Figure 4:
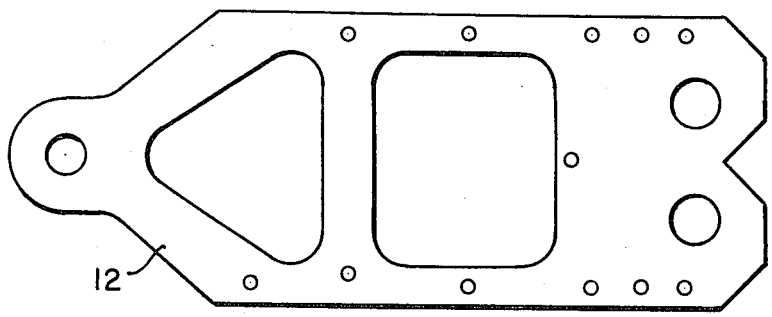
FIG. 4 is a plan view of the top plate of the quick release latch.

U-shaped draw bar 9, better depicted in FIG. 3, surrounds a portion of the free end 22 of the master toggle link 4. The draw bar 9 is pivotally connected to a lever 10. The lever 10 is connected by a pivot pin 11 to the side plate 12. Through bolts 13 allow the top plate shown in FIG. 4, to be connected to the device. Plate spacers 14 prevent the top plate from interferring with the mechanism.

The operation of the device is as follows. The quick release latch is designed as a manually releasable mechanism requiring very low release forces compared to the restrained load. After the load has been placed in jaws 2, the toggle linkage is manually moved forward. As the toggle linkage moves forward the three pivot points 16, 18, and 20 will at some point lie on the same line. This line may be called the center line, and in this position the rear of the jaws are spread apart maximally, closing the throat 6 around the load. The rear parts of the jaws abut the cantilever springs 8 at this point. The amount of travel past the center line is controlled by the stop 7 mounted on the master link 4. The stop 7 makes contact with the slave link 5 preventing further forward movement of the master link. In this position, which is slightly forward of the center line position, the jaws are locked closed, as any attempt to spread the jaws at the throat 6 serves to drive the master link stop 7 harder against the slave link 5. The cantilever springs 8 serve to hold the jaws in this closed position should the load be relaxed at any time.

To release the jaws from the locked or closed position, it is only necessary to move the master link 4 slightly to the rear until it is aft of the center line position. If there is no load being carried, the jaw opening is assisted by the cantilever springs 8 which act against the sides of the jaws. Thus, when the master link 4 is pulled aft of the center line, the jaws spring open. If there is a load acting on the jaws, the load, attempting to wedge the jaws open, drives the jaws open when the master link 4 is pulled aft of the center line. The draw bar 9 and lever 10 are employed to pull the master link 4 aft of the center line. When the draw bar 9 and lever 10 are in the full forward position, the draw bar does not restrict the motion of the master link 4 thereby allowing the toggle links to be pusehd manually into the closed or over center line position. Because of the shape of the draw bar 9, the master link 4 is not restricted from rapid motion into the full open position, nor does master link motion aft affect the draw bar and lever. Release commands can be transmitted to the lever 10 either directly by hand or thru a mechanical transmission system such as a cable or rigid linkage.

Preferably the quick release latch is constructed of steel; however, for lighter duty other materials such as aluminum and high strength plastics could be utilized. Although the latch has special use for restraining aircraft prior to launch or for maintenance run-up purposes, alternate applications could include a helicopter cargo hoist, release for aircraft drop tests, and a replacement for carrier aircraft tension bars. Of course, the latch could also be employed where ever a quick release capability is necessary.

Obviously many modifications and variations of the present invention are possible in light of the above teachings, it is therefore to be understood that, within the scope of the appended claims, the invention may be practiced otherwise than as specifically described.

What is claimed is:

1. A quick release latch comprising:
a side plate;
two jaws, pivotally mounted on said side plate, one end of said jaws cooperating to form a variable throat;
linkage means, pivotally connected to the other end of each jaw at a pivot point on each jaw, for spreading apart and pulling together the other ends of the jaws to close and open said throat,
said linkage means comprising a master toggle link pivotally connected to the other end of one jaw, and a slave toggle link having a first and second end, the first end being pivotally connected to the other end of the second jaw and the second end being pivotally connected to said master toggle link at a third pivot point, whereby when said linkage means is moved such that said pivot points are on the same line, the center line, the throat opening is closed;
stop means mounted on said linkage means for preventing said jaws from opening when said linkage means is in a first position,
said stop means comprising a pin mounted on said master toggle link for engaging said slave toggle link when said linkage means is moved into said first position; and
means for moving said linkage means into and out of said first position.

2. The quick release latch of claim 1 wherein the moving means comprises:
a lever pivotally connected to said plate; and
a draw bar connected at one end to said lever and having its other end cooperating with said linkage means to pull said linkage means out of said first position when said lever is moved in a predetermined direction.

3. The quick release latch of claim 2 further including means mounted on said plate for biasing said jaws into the open position.

4. A quick release latch comprising:
a side plate;
two jaws pivotally mounted on said side plate, one end of said jaws cooperating to form a variable throat;
linkage means pivotally connected to the other end of each jaw at a pivot point on each jaw, for spreading apart and pulling together the other ends of each jaw to close and open said throat;
stop means mounted on said linkage means for preventing said jaws from opening when said linkage means is in a first position;
means for moving said linkage means out of said first position; and
means mounted on said plate for biasing said jaws, said biasing means acting to keep said jaws closed when said linkage means are in said first position and to open said jaws when said linkage means are in a second position.

5. The quick release latch of claim 4 wherein said biasing means comprise a pair of cantilever springs, each abutting the non-cooperating end of one of said jaws and acting to press the abutting jaw ends toward each other.

6. A quick release latch comprising:
a side plate;
two jaws pivotally mounted on said side plate, one end of each jaw cooperating to form a variable throat;
linkage means comprising a pair of longitudinal sections, each section connected pivotally at one end to the other end of a different one of said jaws, the free ends of said sections facing inwards of said jaws;
moving means pivotally connected to the free ends of said sections whereby said sections may be moved so that their longitudinal axes may be aligned to form a center line, or so that said axes may intersect fore or aft of said center line; and
biasing means abutting each said other end of said jaws and acting to force said other ends inward toward each other.

7. A latch as in claim 6, further including:
stop means mounted on said linkage means for preventing said jaws from opening when said longitudinal sections are in such position that their axes intersect fore of said center line.

* * * * *